UNITED STATES PATENT OFFICE 1,956,113

REDUCTION OF THIOSULPHATE SALTS

Alexander L. Wilson, Plainfield, N. J., assignor to Carbide and Carbon Chemicals Corporation, a corporation of New York No Drawing. Application February 12, 1931, Serial No. 515,427

11 Claims. (Cl. 260—127)

The invention is a process for reducing thiosulphate salts. It is particularly adapted to the reduction of these salts occurring in gas absorption systems which employ amine solutions. In general, the process comprises treating such solutions with hydrogen sulphide gas, or a gas containing a substantial proportion of this substance, with or without previous concentration or dilution. The treatment of the solution is conducted under appropriate conditions of temperature and pressure.

Alkaline solutions of various types are extensively employed as gas purifying or absorbing media. Solutions of various amines, such as the hydroxyalkylamines, and other aliphatic and aromatic amines have been proposed as gas absorbents. Gas absorbing systems employing amines are advantageous in absorbing hydrogen sulphide gas from gaseous mixtures in which its presence is undesirable. A disadvantage encountered in using amine solutions for this purpose is the fact that gases containing hydrogen sulphide usually contain, in addition, small quantities of air or sulphur oxides. These substances induce oxidation and result in a deterioration of the solution due to the formation of thiosulphate salts of the amines. The solution becomes less effective not only because a quantity of the amine is in combination, but also because the presence of the thiosulphate salts alters the physical properties of the solution and lowers the efficiency of the system.

The principal object of my invention is to provide a method of reducing these thiosulphate salts thereby restoring an equivalent amount of active absorbing material to the system. The process is of value for the proper operation of the absorption system, and in addition it employs, in its practice, hydrogen sulphide containing gas which may be recovered from the absorption process, and which is ordinarily a waste gas of little or no commercial value.

In practicing my invention hydrogen sulphide, alone or in a gaseous mixture containing a substantial proportion of hydrogen sulphide which is substantially free from gases which are reactive with the ingredients of the solution being treated to form substances not easily removable therefrom, is passed through the solution containing the deleterious thiosulphate salts. The temperature of reduction may vary widely, but it is preferably carried out at about 200° F. The result of the reaction is the formation of free sulphur and easily decomposable salts of the amine base, such as the normal or acid sulphides, together with completely regenerated amine. The sulphur may be removed by filtration or any suitable means, and the excess gases applied to reduce the thiosulphate may be removed by boiling the solution. The solution may be concentrated previous to reduction and pressures greater than atmospheric pressure may be employed.

The action of my process may be shown by the following equations:

(1) 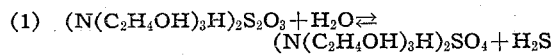

(2) 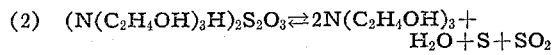

(3) 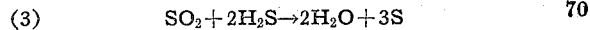

Equations (1) and (2) are reversible, and the present process functions to control the direction of these reactions. Equation (1) to the right is to be avoided, and equation (2) to the right is to be accelerated. This is brought about by concentrating the solution, removing water which unbalances (1) to the left and (2) to the right; by adding H₂S which further unbalances (1) to the left; and by removing sulphur as a precipitate and SO₂ as shown in Equation (3) which further accelerates Equation (2) to the right. The action is shown above as applied to triethanolamine merely for the purposes of illustration. Instead of triethanolamine, any amine may be combined with the —S₂O₃ radicle and reduced by my process.

The following examples are illustrative of the invention:

I. A solution containing 20% triethanolamine and 5% triethanolamine thiosulphate was concentrated to one-half its original volume. The solution was maintained at a temperature above 200° F. and a gas containing 40% hydrogen sulphide and 60% carbon dioxide was bubbled through the solution for 24 hours. The solution was then boiled to expel all hydrogen sulphide and carbon dioxide and the free sulphur was removed by filtration. The solution was now found to contain 90% of the triethanolamine, which was formerly present as the thiosulphate salt, as free triethanolamine.

II. A solution containing 24% triethanolamine and 5% triethanolamine thiosulphate was concentrated until the content of free and combined triethanolamine reached 60%. The cool solution was saturated with a gas containing 40% hydrogen sulphide and 60% carbon dioxide. This saturated solution was placed in an autoclave and heated for 4 hours at a temperature of 195° F. and at a pressure of 150 pounds per square inch. The liquid was withdrawn, boiled to expel excess hydrogen sulphide and carbon dioxide and the solution was decanted from the sulphur. This treatment resulted in the recovery of 85% of the triethanolamine which was formerly combined as the thiosulphate salt, as free triethanolamine.

The invention is not restricted to the specific substances and conditions herein set forth. The process may be carried out with many modifications and is adaptable to the reduction of many thiosulphate salts.

I claim:

1. In a process for reducing thiosulphate salts of amines in solution, the step which comprises treating the solution with an inert gas containing a substantial proportion of hydrogen sulphide.

2. In a process of reducing hydroxyalkylamine thiosulphate salts in solution, the step which comprises treating the solution with an inert gas containing a substantial proportion of hydrogen sulphide.

3. A process of reducing ethanolamine thiosulphate salts in solution which comprises treating the solution with an inert gas containing a substantial proportion of hydrogen sulphide.

4. A process for reducing triethanolamine thiosulphate salts in solution which comprises treating the solution with an inert gas containing a substantial proportion of hydrogen sulphide.

5. A process for reducing triethanolamine thiosulphate salts in solution which comprises treating the solution with an inert gas containing a substantial proportion of hydrogen sulphide at a temperature of about 200° F.

6. A process for reducing triethanolamine thiosulphate salts in solution which comprises treating the solution with an inert gas containing a substantial proportion of hydrogen sulphide at a temperature of about 200° F. and a pressure greater than atmospheric pressure.

7. A process for reducing triethanolamine thiosulphate salts in solution which comprises treating the solution with an inert gas containing a substantial proportion of hydrogen sulphide at a temperature of about 200° F. and a pressure of about 150 pounds per square inch.

8. In a process for reducing amine thiosulphate salts in solution which comprises removing water from the solution, the step and treating the solution with an inert gas containing a substantial proportion of hydrogen sulphide.

9. In a process for reducing hydroxyalkylamine thiosulphate salts in solution, the step which comprises removing water from the solution and treating the solution with an inert gas containing a substantial proportion of hydrogen sulphide.

10. A process for reducing ethanolamine thiosulphate salts in solution which comprises concentrating the solution and treating the solution while hot with an inert gas containing a substantial proportion of hydrogen sulphide.

11. A process for reducing triethanolamine thiosulphate salts in solution which comprises concentrating the solution and treating the solution at about 200° F. with an inert gas containing a substantial proportion of hydrogen sulphide.

ALEXANDER L. WILSON.

CERTIFICATE OF CORRECTION.

Patent No. 1,956,113.                                              April 24, 1934.

ALEXANDER L. WILSON.

It is hereby certified that error appears in the printed specification of the above numbered patent requiring correction as follows: Page 2, line 90, claim 8, strike out the comma and words ", the step" and insert the same after "solution" in line 89, of same claim; and that the said Letters Patent should be read with this correction therein that the same may conform to the record of the case in the Patent Office.

Signed and sealed this 7th day of August, A. D. 1934.

Leslie Frazer (Seal)                                                 Acting Commissioner of Patents.